United States Patent [19]

Burns

[11] 4,266,850

[45] May 12, 1981

[54] INTEGRATED BIAS FOR WAVEGUIDE AMPLITUDE MODULATOR

[75] Inventor: William K. Burns, Alexandria, Va.

[73] Assignee: The United States of America as represented by the Secretary of the Navy, Washington, D.C.

[21] Appl. No.: 116,173

[22] Filed: Jan. 28, 1980

[51] Int. Cl.³ .............................. G02B 5/14; G02F 1/00
[52] U.S. Cl. .................................................. 350/96.14
[58] Field of Search ................ 350/96.12, 96.13, 96.14

[56] References Cited

U.S. PATENT DOCUMENTS

| | | | |
|---|---|---|---|
| 3,920,314 | 11/1975 | Yajima | 350/96.14 |
| 4,070,094 | 1/1978 | Martin | 350/96.14 |
| 4,111,521 | 9/1978 | Streifer et al. | 350/96.13 |
| 4,142,775 | 3/1979 | Ramaswamy et al. | 350/96.14 |

Primary Examiner—Stewart J. Levy
Attorney, Agent, or Firm—R. S. Sciascia; William T. Ellis; Vincent J. Ranucci

[57] ABSTRACT

An interferometric waveguide amplitude modulator for conducting optical energy, and having an integral means for producing a linear response to a small applied voltage (approximately less than 100 volts), includes a first waveguide arm which has an increased physical length relative to a second waveguide arm, the increase $\Delta$ being defined by $\Delta = \pi/(2Kn)$, where $K = 2\pi/\lambda$ and $K$ is the free-space wavevector, $\lambda$ is the free-space wavelength of the optical energy and n is the index of refraction of the waveguide material. The increase, $\Delta$, provides an integral bias of $\pi/2$ radians to the modulator for producing a linear response to a small applied voltage.

3 Claims, 2 Drawing Figures

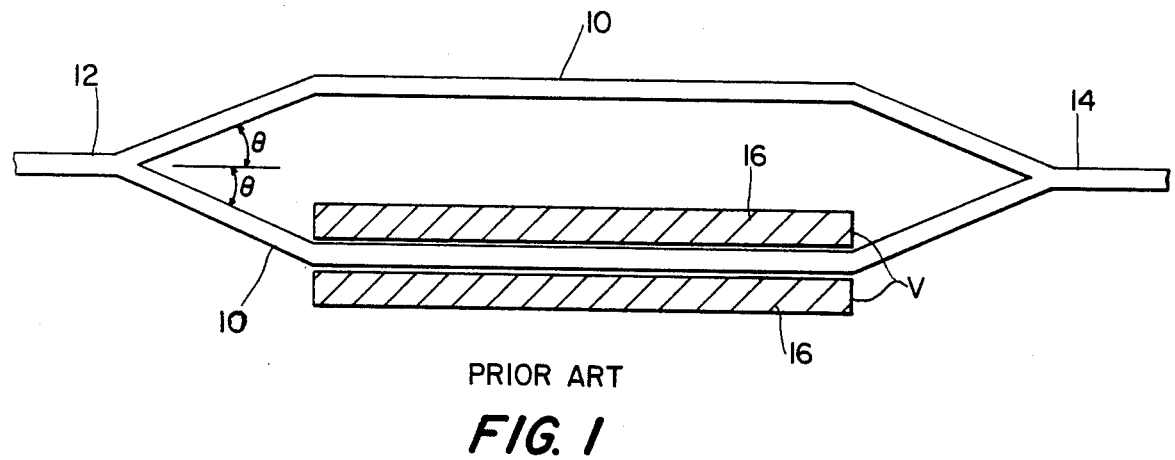
PRIOR ART
FIG. 1
FIG. 2
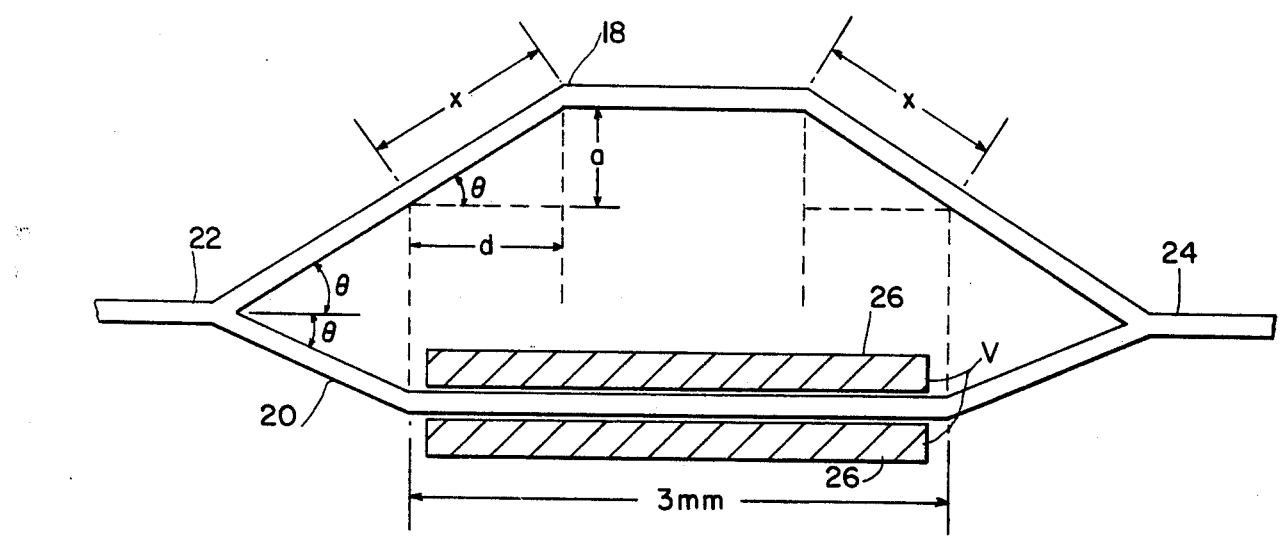

INTEGRATED BIAS FOR WAVEGUIDE AMPLITUDE MODULATOR

BACKGROUND OF THE INVENTION

This invention relates generally to optical-waveguide modulators and more particularly to an integral, interferometric, optical-waveguide, amplitude modulator which has a linear response to small applied voltages (approximately less than 100 volts).

Interferometric waveguide modulators, which are integrated optical analogues of Mach-Zehnder bulk interferometers, are commonly used to provide amplitude modulation in integrated optical circuits. In existing embodiments, the waveguide arms of the interferometer are of equal physical length, or balanced. When voltages are applied to electrodes near the waveguide arms, electric fields are formed across the waveguides and, through the electro-optic effect, the optical path lengths of the two arms are made to differ. This difference in optical path length results in mode conversion effects at the output branch which results in the desired amplitude modulation. However, the resulting amplitude modulation is quadratic in response to an applied voltage. Such a response is disadvantageous for many applications such as electromagnetic field measurement sensors and for optical polarization-independent operation, that is, amplitude modulation which is independent of the polarization state (TE or TM) of the optical mode. Such applications and a more practical use of interferometers require a linear response to applied voltages. For a linear response, a built-in phase bias or phase-shift of $\pi/2$ radians is required. The problem is how to provide the bias of $\pi/2$ radians. In bulk electro-optic modulators this is usually accomplished electrically, i.e., by applying a d.c. half-wave voltage, that is, a d.c. voltage for retarding optical energy by one-half of a wavelength, or by the insertion of a birefringent (quarter-wave) plate in the optical path. Bias voltages are undesirable for electromagnetic field measurement sensors because the voltages substantially decrease the versatility of the device. Bias voltages are difficult to apply for optical polarization-independent operations due to the complexity of the electrode configuration. The waveguide nature of interferometers does not allow the insertion of classical waveplates in the optical path.

Providing the bias of $\pi/2$ radians by applying thin film overlays on one of the waveguide arms also is difficult because of the small separation ($\simeq 11$ microns) between the arms and the additional fabrication steps. Overlays may also require tuning to achieve a proper change in phase.

SUMMARY OF THE INVENTION

It is the general purpose and object of the present invention to provide an integral, interferometric, optical-waveguide, amplitude modulator having a linear response to small applied voltages.

Still another object is to provide a reliable modulator which can be easily and inexpensively manufactured.

These and other objects of the present invention are accomplished by increasing the physical length of a first waveguide arm relative to that of a second waveguide arm, the increase, $\Delta$, being defined by $\Delta = \pi/(2Kn)$, where $K = 2\pi/\lambda$ and K is the free-space wavevector, $\lambda$ is the free-space wavelength of the optical energy, and n is the index of refraction of the waveguide material.

The increase, $\Delta$, provides an integral bias of $\pi/2$ radians to the modulator for producing a linear modulation of signal amplitude in response to small applied voltages.

The novel feature of the present invention is the difference in length of $\pi/(2Kn)$ between two parallel waveguide arms, that is, an unbalanced bridge for providing a built-in phase bias of $\pi/2$ radians between two optical paths.

The present invention has the following advantages over the prior art: The physical extension of one waveguide arm is passive and is an integral part of an interferometric waveguide modulator, and therefore increases the versatility of such modulators by providing the modulators with a linear response to small applied voltages without a requirement for collateral equipment such as electrical connections near the arms of the waveguide or quarter-wave plates in the optical path; the invention is polarization-insensitive; no tuning is required for a given wavelength; and the invention provides a more practical use of interferometers for many applications such as electromagnetic field measurements and optical polarization-independent operations.

Other objects and advantages of the invention will become apparent from the following detailed description of the invention when considered in conjunction with the accompanying drawing wherein:

BRIEF DESCRIPTION OF THE DRAWING

FIG. 1 is a schematic plan view of a prior-art, interferometer with waveguide arms of equal length.

FIG. 2 is a schematic plan view of an interferometer having waveguide arms of different physical lengths for providing a linear response to a small applied voltage.

DETAILED DESCRIPTION OF THE INVENTION

Referring now to the drawing, FIG. 1 shows a prior-art interferometer having parallel waveguide arms 10 of equal physical length. Each arm 10 extends from an input branch 12 to an output branch 14. The waveguide arms 10 are balanced. As a voltage (V) is typically applied to electrodes 16 near at least one waveguide arm, the optical-path lengths of the two arms differ as a result of the difference in electric fields across the arms. Optical energy (light) passes through the input branch and splits so that the amplitude of that traversing each arm is half that of the light in the input branch. The different optical-path lengths cause the light in one arm to be out of phase with the light in the second arm. The light from both arms, being out-of-phase, combines at the output branch and thereby modulates the amplitude of the light. The authors, W. K. Burns, T. G. Giallorenzi, R. P. Moeller and E. J. West, further explain modulation of optical energy in Applied Physics Letter, 33, 944 (1978).

If $\phi$ is the difference in phase seen by light traversing each arm (this is referred to as the "retardation" in bulk modulators), the output intensity (I) can be expressed as $$I_{out}/I_{in} = \cos^2(\phi/2). \quad (1)$$

In FIG. 1, $\phi$ is proportional to some applied voltage (V) or $\phi = CV$. Thus, for small applied voltages (V), (approximately less than 100 volts), eq. 1 becomes $$I_{out}/I_{in} \simeq 1 - (C^2V^2/4) \quad (2)$$

and the resulting modulation is quadratic with voltage. For a linear response to small voltages, a built-in phase bias or phase-shift of $\pi/2$ radians is required so that $$\phi = \pi/2 + CV \qquad (3)$$

and for small (V)

$$\text{Iout/Iin} \approx \tfrac{1}{2} - CV/2 \qquad (4)$$

which is the desired linear response to voltage.

FIG. 2 illustrates the present invention and shows an interferometer having a first waveguide arm 18 which is physically longer than a second waveguide arm 20. Each of the waveguide arms 18 and 20 extends from an input branch 22 to an output branch 24. The difference, $\Delta$, in length between waveguide arms 18 and 20 is defined as $$\Delta = \pi/(2kn) \qquad (5)$$

where $K = 2\pi/\lambda$ and is the free-space wavevector, $\lambda$ is the free-space wavelength of the optical energy, and n is the index of refraction of a material, such as titanium-diffused lithium niobate (Ti:LiNbO$_3$), from which the waveguide arms are made.

This difference in physical length effectively unbalances the waveguide arms and provides the required bias of $\pi/2$ radians for achieving a linear response to small voltages (V) that are typically applied to electrodes 26.

The required increased path length, $\Delta$, is defined by the $\pi/2$ phase shift. At $V=0$ and from eqs. (3) and (5)

$$\phi = \pi/2 = Kn\Delta. \qquad (6)$$

For the waveguide material Ti:LiNbO$_3$, n=2. 2, and at an operational wavelength $\lambda = 0.633$ um, for example, $\Delta = 720$Å. This incremental length is small in comparison to existing tolerances involved in the fabrication of photolithographic masks (10,000 Å = 1 um) which are required for forming the present invention. However, this value of $\Delta$ is achievable because the branching angle $\theta$ is typically very small ($\approx 0.6°$), and the length of the interferometer is typically very long ($\approx 3$ mm). One arm can be extended, maintaining the branch angle for as long as is necessary to add the incremental length $\Delta$.

From FIG. 2, $\Delta$ may be expressed as $$\Delta = 2(X - d) = 2d\left(\frac{1}{\cos\theta} - 1\right). \qquad (7)$$

For the values $\theta = 0.6°$, a = 7 um, and d = 688 um, which are chosen in integral microns to conform to machine tolerances, $$\Delta = 732 \text{ Å}.$$

This value of $\Delta$ is within 2% of the desired 720 Å and, therefore, is within acceptable tolerances.

In additon to Ti:LiNbO$_3$, any optical waveguide material, such as gallium aluminum arsenide (GaAlAs), on which channel waveguides can be fabricated may be used with the present invention.

Obviously many more modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An interferometric, waveguide, amplitude modulator for conducting optical energy, comprising:

first and second waveguide arms, said arms having a common input and a common output, said first waveguide arm having an increased physical length, $\Delta$, relative to said second waveguide arm, said length $\Delta$ being defined by $$\Delta = \pi/(2Kn),$$

where
$K = 2\pi/\lambda$, said K being the free-space wavevector,
$\lambda$ is the free-space wavelength of the optical energy, and
n is the index of refraction of a material from which said modulator is made,
said length, $\Delta$, providing an integral phase bias of $\pi/2$ radians to said modulator for producing a linear response to a small (approximately less than 100 volts) applied voltage.

2. The modulator of claim 1 wherein said material is titanium-diffused lithium niobate (Ti:LiNbO$_3$).

3. An interferometric, waveguide, amplitude modulator comprising:

first and second elongated light-guiding means originating from a first common elongated light-guiding means, and terminating at a second common elongated light-guiding means, a first portion, X, of said first elongated light-guiding means branching at an angle, $\theta$, from the axis of said first common elongated light-guiding means, a second portion, X, of said first elongated light-guiding means branching at an angle, $\theta$, from the axis of said second common elongated light-guiding means, said first portion, X, projecting a length, d, along said axis of the first common elongated light-guiding means, said second portion, X, projecting a length, d, along said axis of the second common elongated light-guiding means, said first elongated light-guiding means having an increased physical length, $\Delta$, relative to said second elongated light-guiding means, said length $\Delta$ being defined by $$\Delta = 2(X - d) = 2d\left(\frac{1}{\cos\theta} - 1\right),$$

said length, $\Delta$, providing an integral phase bias of $\pi/2$ radians to said modulator for producing a linear response to a small (approximately less than 100 volts) applied voltage.

* * * * *